Figure 1:
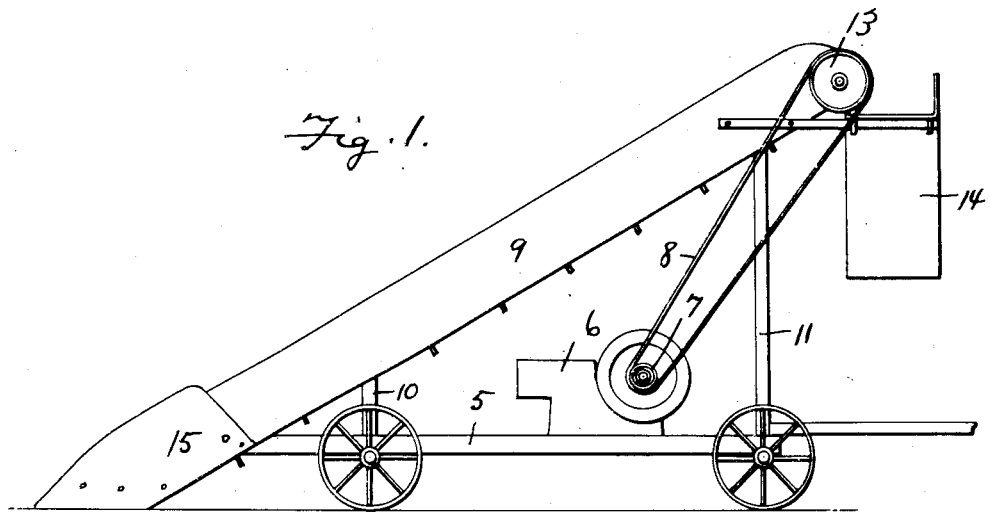

Aug. 20, 1929.  S. TERAO  1,725,112
BEET LOADER
Filed June 11, 1927   2 Sheets-Sheet 1

Inventor
Sueo Terao
By Clarence A. O'Brien
Attorney

Aug. 20, 1929.  S. TERAO  1,725,112
BEET LOADER
Filed June 11, 1927  2 Sheets-Sheet 2

Inventor
Sueo Terao
By Clarence A. O'Brien
Attorney

Patented Aug. 20, 1929.

1,725,112

UNITED STATES PATENT OFFICE.

SUEO TERAO, OF MITCHELL, NEBRASKA.

BEET LOADER

Application filed June 11, 1927. Serial No. 198,154.

The present invention relates to a machine for loading beets from the ground into wagons and has for its principal object to provide a structure which will pick the beets from the ground, shake the dirt off the beets, and then elevate the beets up into an inclined trough from which they may gravitate into a wagon.

Another very important object of the invention lies in the provision of means for simultaneously shaking the dirt from the beets and elevating them to an elevating conveyor.

A still further important object of the invention resides in the provision of a machine of this nature which is simple in its construction, strong and durable, inexpensive to manufacture, thoroughly efficient and reliable in operation, easy to handle, compact and convenient, and otherwise well adapted to the purpose for which it is designed.

With the above and numerous other objects in view as will appear as the description proceeds, the invention resides in certain novel details of construction, and in the combination and arrangement of parts as will be hereinafter more fully described and claimed.

Figure 2:
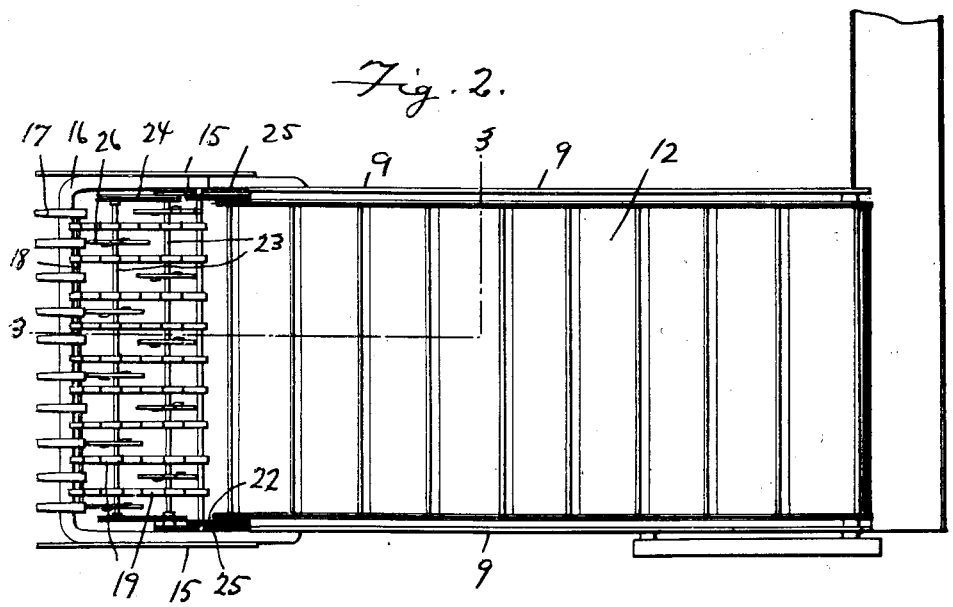
Figure 3:
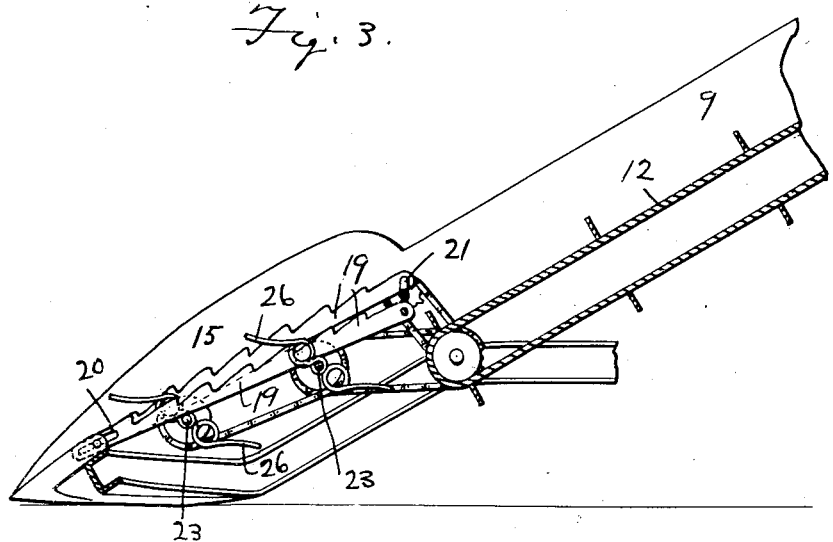
Figure 4:
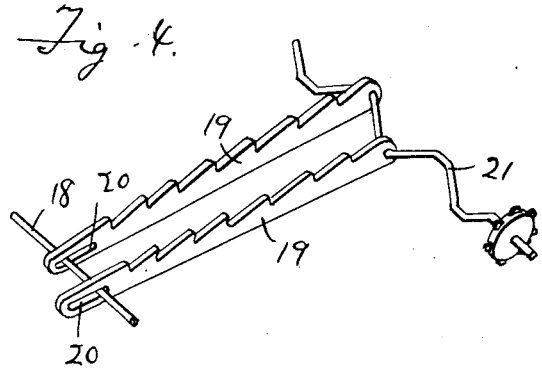

In the drawing:

Figure 1 is a side elevation of the machine embodying the features of my invention, Figure 2 is a top plan view thereof, Figure 3 is a fragmentary longitudinal section taken substantially on the line 3—3 of Figure 2, and Figure 4 is a detail perspective view showing a pair of the oscillating and reciprocating inclined grates.

Referring to the drawing in detail it will be seen that the numeral 5 denotes a wheeled frame having a suitable prime mover 6 mounted thereon for driving a pulley 7 and a belt 8. A pair of sides 9 are supported above the frame 5 in an inclined position by means of standards 10 and 11 or in any other suitable manner. An endless conveyor 12 is mounted between the sides 5 and is operable by a pulley 13 over which the belt 8 is trained. An inclined trough 14 is mounted to the rear of the upper ends of the sides 9 and inclines downwardly and laterally. Extension plates 15 are mounted on the lower ends of the sides 9. A U-shaped member 16 has its extremities fixed to the sides 9 and the bight or intermediate portion thereof supports a plurality of spaced shovel teeth 17. A rod 18 is supported in the rear upper extremities of the shovel teeth 17. The numerals 19 denote a plurality of grate bars the forward ends of which are provided with elongated slots 20 receiving the rod 18 and the rear ends thereof are journaled on the cranks of a crank shaft 21 journaled in the sides of the U-shaped member 16. This crank shaft 21 is operated by a chain and sprocket structures 22 from the endless conveyor 12. A pair of shafts 23 are journaled between the sides of the U-shaped member 16 forwardly of the crank shaft and rearwardly of the rod 18 and are connected together by chain and sprocket structures 24 to rotate together. These shafts 23 are operatively connected to the conveyor 12 by means of chain and sprocket structures 25. On each shaft 23 there are disposed a plurality of spring fingers 26 which swing between the grate bars 19.

From the above detailed description it will be seen that when the shovel teeth 17 are engaged with a pile of beets, said beets will be moved upwardly by the staggered oscillation of the plurality of grate bars 19 and also the reciprocation which is imparted thereto by the crank shaft. This upward movement of the beets will be assisted by the spring fingers 26 which swing upwardly between the grates and swing downwardly below them, that is in Figure 3 they rotate in a clockwise direction. This cooperation between the grate bars and the spring fingers will thoroughly shake the dirt from the beets before they are delivered to the endless conveyor elevating structure 12.

It is thought that the construction, operation, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction, and in the combination and arrangement of parts may be resorted to without departing from the spirit or scope of the invention as

Having thus described my invention, what I claim as new is:

1. A machine of the class described including, in combination, a supporting structure, an inclined endless conveyor mechanism mounted on the supporting structure, a frame member on the supporting structure at the lower end of the conveyor mechanism, shovel teeth on said frame, and means between the shovel teeth and the lower ends of the conveyor mechanism for shaking dirt from beets and delivering them to said mechanism, said means comprising a rod supported by the shovel teeth, a crank shaft journaled in the frame to the rear of and above the rod and above the lower end of the endless conveyor mechanism, a plurality of grate bars on the cranks of the crank shaft and having slots to receive the rod.

2. A machine of the class described including, in combination, a supporting structure, an inclined endless conveyor mechanism mounted on the supporting structure, a frame member on the supporting structure at the lower end of the conveyor mechanism, shovel teeth on said frame, and means between the shovel teeth and the lower ends of the conveyor mechanism for shaking dirt from beets and delivering them to said mechanism, said means comprising a rod supported by the shovel teeth, a crank shaft journaled in the frame to the rear of and above the rod and above the lower end of the endless conveyor mechanism, a plurality of grate bars on the cranks of the crank shaft and having slots to receive the rod, a shaft journaled in the frame and having spring teeth radiating therefrom between the grate bars.

3. A machine of the class described including, in combination, a supporting structure, an inclined endless conveyor mechanism mounted on the supporting structure, a frame member on the supporting structure at the lower end of the conveyor mechanism, shovel teeth on said frame, and means between the shovel teeth and the lower ends of the conveyor mechanism for shaking dirt from beets and delivering them to said mechanism, said means comprising a rod supported by the shovel teeth, a crank shaft journaled in the frame to the rear of and above the rod and above the lower end of the endless conveyor mechanism, a plurality of grate bars on the cranks of the crank shaft and having slots to receive the rod, a shaft journaled in the frame and having spring teeth radiating therefrom between the grate bars, and means operatively connecting the conveyor mechanism and said shafts.

4. A machine of the class described including, in combination, a supporting structure, an inclined endless conveyor mechanism mounted on the supporting structure, a frame member on the supporting structure at the lower end of the conveyor mechanism, shovel teeth on said frame, and means between the shovel teeth and the lower ends of the conveyor mechanism for shaking dirt from beets and delivering them to said mechanism, said means comprising a rod supported by the shovel teeth, a crank shaft journaled in the frame to the rear of and above the rod and above the lower end of the endless conveyor mechanism, a plurality of grate bars on the cranks of the crank shaft and having slots to receive the rod, a shaft journaled in the frame and having spring teeth radiating therefrom between the grate bars, and means operatively connecting the conveyor mechanism and said shafts, a prime mover on the supporting structure, and means operatively connecting the prime mover with the conveyor mechanism.

5. In a beet loader, a supporting structure, shovel teeth on said supporting structure, a plurality of grate bars, means for mounting and operating the grate bars so that they will simultaneously reciprocate and oscillate in staggered relationship, a shaft in the supporting structure, rake spring teeth radiating from the shaft between the grate bars.

In testimony whereof I affix my signature.

SUEO TERAO.